(12) United States Patent
Liang et al.

(10) Patent No.: US 12,360,334 B2
(45) Date of Patent: Jul. 15, 2025

(54) LENS MODULE

(71) Applicant: NEWMAX TECHNOLOGY CO., LTD., Taichung (TW)

(72) Inventors: Yung-Fu Liang, Taichung (TW); Yu-Wen Huang, Taichung (TW); Jiong-Hong Chen, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 467 days.

(21) Appl. No.: 17/970,670

(22) Filed: Oct. 21, 2022

(65) Prior Publication Data

US 2024/0053579 A1    Feb. 15, 2024

(30) Foreign Application Priority Data

Aug. 15, 2022    (TW) .................................. 111130614

(51) Int. Cl.
*G02B 7/14*         (2021.01)
*H04N 23/55*      (2023.01)

(52) U.S. Cl.
CPC ............... *G02B 7/14* (2013.01); *H04N 23/55* (2023.01)

(58) Field of Classification Search
CPC . G02B 7/14; G02B 7/02; G02B 7/021; G02B 7/022; G02B 7/025; G02B 7/006; H04N 23/55

See application file for complete search history.

(56) References Cited

U.S. PATENT DOCUMENTS

2020/0049932 A1*  2/2020  Wei .................. G02B 7/022
2020/0319424 A1* 10/2020  Feng ................. G02B 7/021

* cited by examiner

*Primary Examiner* — James C. Jones
(74) *Attorney, Agent, or Firm* — Juan Carlos A. Marquez; Marquez IP Law Office, PLLC

(57) ABSTRACT

A lens module includes: a lens barrel including a annular structure, an inner annular surface surrounding the central axis and an outer annular surface opposite to and surrounding the inner annular surface, wherein the inner annular surface forms an accommodating space; an optical lens assembly and an optical filter sequentially disposed in the accommodating space from the object side to the image side; wherein the annular structure is disposed on the inner annular surface and surrounds the central axis, the annular structure includes at least two step portions and at least two bevel portions, all the step portions and the bevel portions are close to the image side, and the optical filter is disposed on the step portions; and the step portions and the bevel portions are alternately disposed along a annular path of the inner annular surface.

11 Claims, 6 Drawing Sheets

LENS MODULE

CROSS-REFERENCE TO RELATED APPLICATION

This application claims the benefit of Taiwan Patent Application No. 111130614, filed on Aug. 15, 2022, which is hereby incorporated by reference for all purposes as if fully set forth herein.

BACKGROUND

Technical Field

The present disclosure relates to a lens module, and in particular, to a lens module having an adhesive only dispensed once.

Related Art

The lens module of the digital camera generally includes a lens barrel, an optical lens assembly, an optical filter, and the like. During assembly, the optical lens assembly and the optical filter are sequentially arranged into the lens barrel, and the optical filter is fixed by an adhesive dispensing manner, so as to fix the optical lens assembly.

However, during an adhesive dispensing process and an assembly of the optical filter, an ultraviolet (UV) glue (that is, an ultraviolet curing glue) may first be arranged on a periphery of the last optical lens of the optical lens assembly for the first time, and then, the UV glue may be arranged on a periphery of a step provided with the optical filter for the second time, and finally, the optical filter is placed and the UV glues for the first and second times are irradiated by UV for curing. In this way, two adhesive dispensing steps are formed, resulting in poor assembly efficiency of the lens module.

Therefore, a lens module needs to be provided, to resolve the foregoing problems.

SUMMARY

An objective of the present disclosure is to provide a lens module having an adhesive only dispensed once.

To achieve the above objective, the present disclosure provides a lens module, defining a central axis, an object side, and an image side opposite to object side, and the lens module comprising: a lens barrel comprising an annular structure, an inner annular surface surrounding the central axis and an outer annular surface opposite to and surrounding the inner annular surface, wherein the inner annular surface forms an accommodating space; and an optical lens assembly and a optical filter sequentially disposed in the accommodating space from the object side to the image side; wherein the annular structure is disposed on the inner annular surface and surrounds the central axis, the annular structure comprises at least two step portions and at least two bevel portions, all the step portions and the bevel portions are close to the image side, and the optical filter is disposed on the step portions; and the step portions and the bevel portions are alternately disposed along an annular path of the inner annular surface.

Due to the design of the bevel portions and the grooves, the adhesive is dispensed only once. The adhesive (for example, an UV glue, i.e., an ultraviolet curing glue, but is not limited thereto) may flow down from the bevel portions and the grooves to the annular trench between the last optical lens of the optical lens assembly and the lens barrel, and is finally irradiated by UV for curing. In this way, the optical filter and the last optical lens (i.e., the optical lens closest to the image side) of the optical lens assembly can be fixed simultaneously, to improve the adhesive dispensing efficiency, thereby improving the assembly efficiency of the lens module.

DETAILED DESCRIPTION

To make the foregoing objectives, characteristics and features of the present disclosure more comprehensible, preferred embodiments of the present disclosure are described in detail below with reference to the accompanying drawings.

Figure 1:
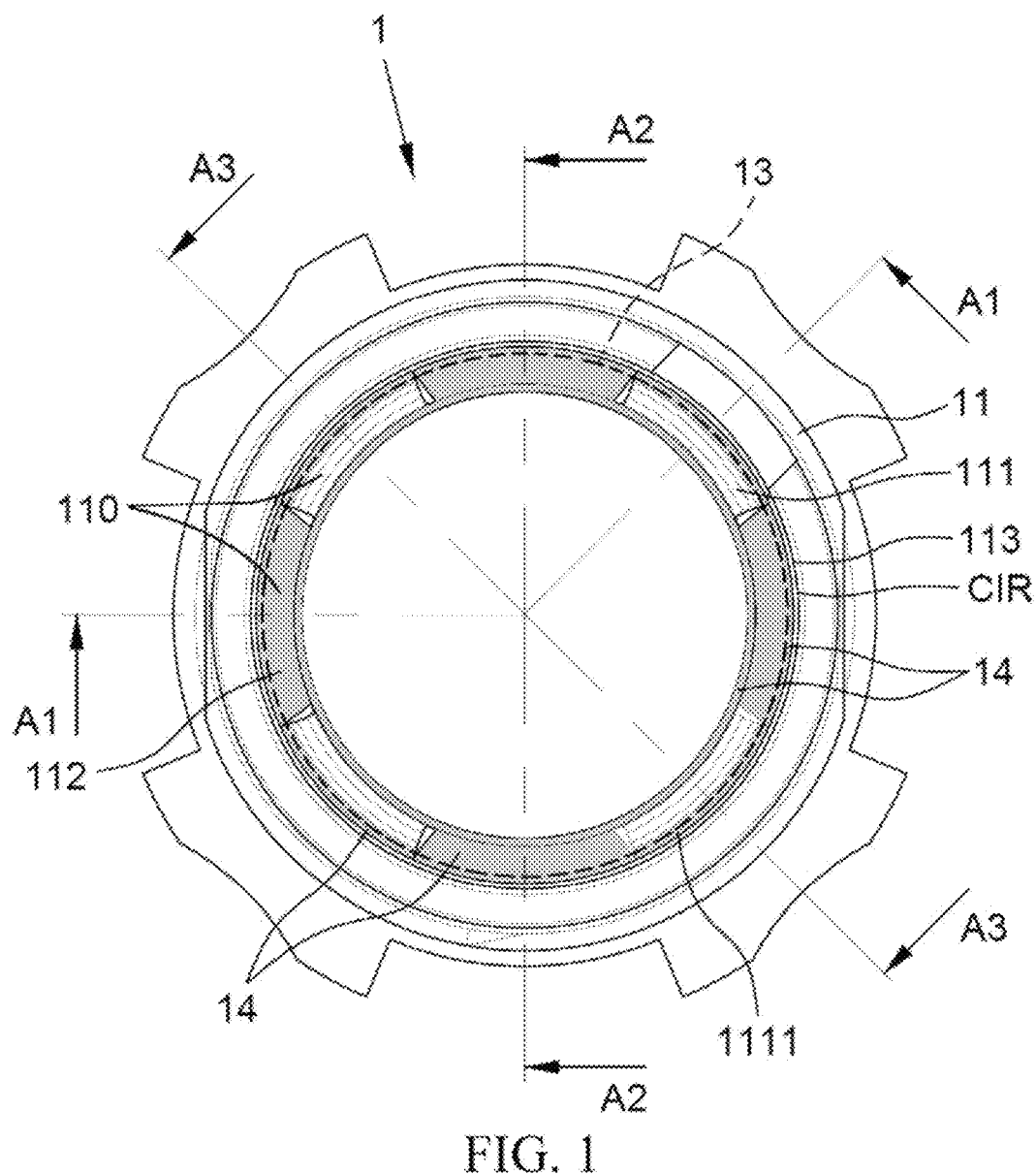
FIG. 1 is a schematic plan view of a lens module according to a first embodiment of the present disclosure.
Figure 2:
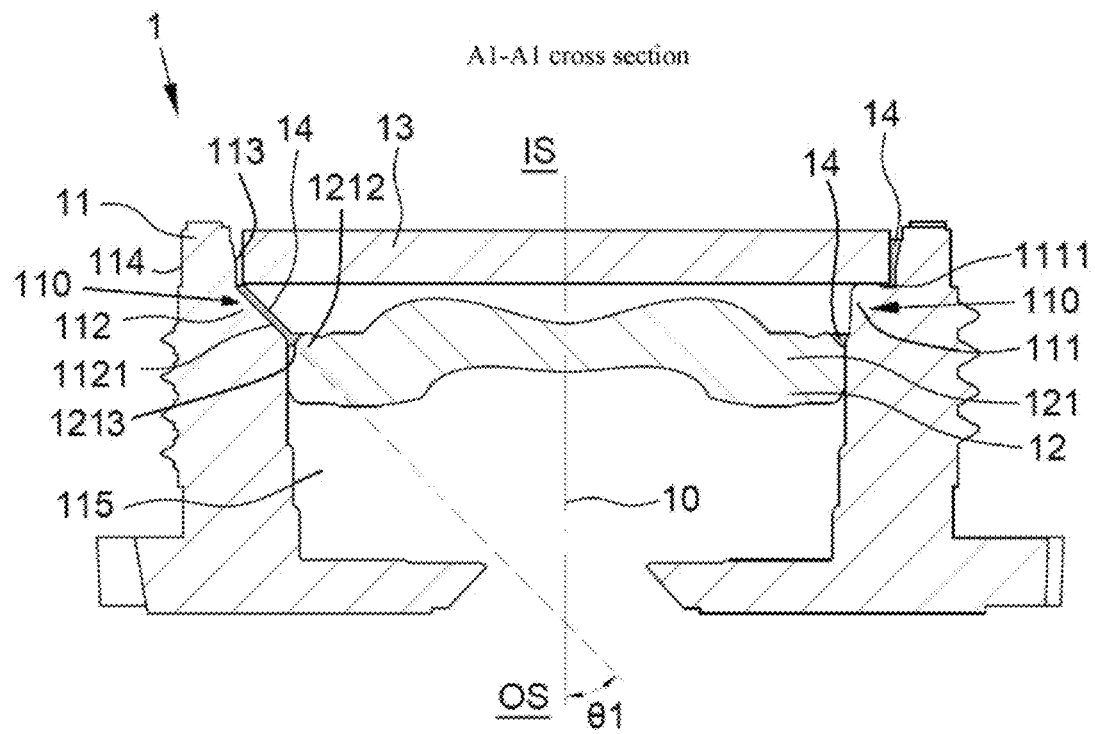
FIG. 2 is a schematic cross-sectional view of a lens module along a section line A1-A1 in FIG. 1 according to the present disclosure.
Figure 3:
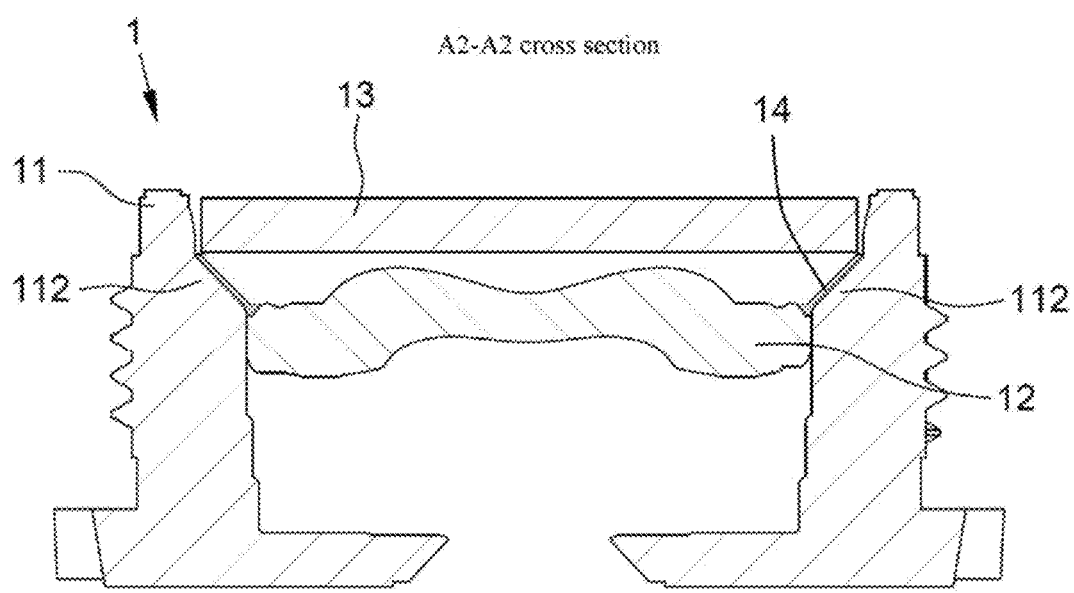
FIG. 3 is a schematic cross-sectional view of a lens module along a section line A2-A2 in FIG. 1 according to the present disclosure.
Figure 4:
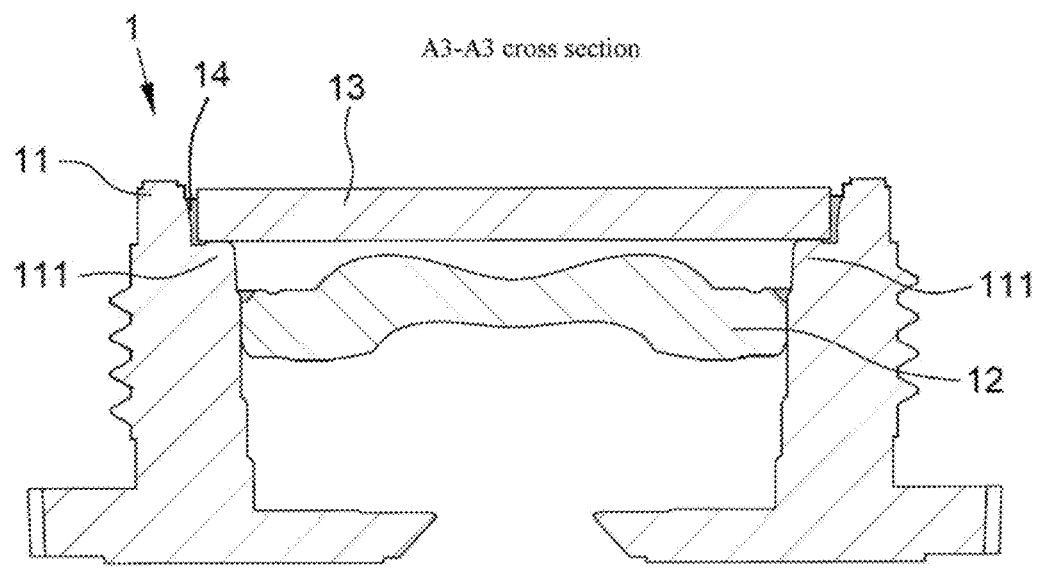
FIG. 4 is a schematic cross-sectional view of a lens module along a section line A3-A3 in FIG. 1 according to the present disclosure.

FIG. 1 is a schematic plan view of a lens module according to a first embodiment of the present disclosure, wherein a contour of an optical filter is indicated by a dashed line. FIG. 2, FIG. 3 and FIG. 4 are schematic cross-sectional views of a lens module along section lines A1-A1, A2-A2, and A3-A3 in FIG. 1 according to the present disclosure. Referring to FIG. 1 to FIG. 4, the lens module 1 defines a central axis 10, an object side OS, and an image side IS opposite to the object side OS. The lens module 1 includes a lens barrel 11, an optical filter 13, an optical lens assembly 12, and an adhesive 14. The lens barrel 11 includes an inner annular surface 113 surrounding the central axis 10 and an outer annular surface 114 opposite to and surrounding the inner annular surface 113. The inner annular surface 113 forms an accommodating space 115. The lens barrel 11 may be made of a plastic material.

Referring to FIG. 1 and FIG. 2 again, the lens barrel 11 includes an annular structure 110. The annular structure 110 is disposed on the inner annular surface 113 and surrounds the central axis 10. The annular structure 110 includes at least two step portions 111 and at least two bevel portions 112. All the step portions 111 and the bevel portions 112 are close to the image side IS. In this embodiment, the annular structure 110 includes at least two step portions 111 and at least two bevel portions 112. The step portions 111 and the bevel portions 112 are alternately disposed along an annular path CIR of the inner annular surface 113. In this embodiment, the annular structure 110 includes four step portions 111 and four bevel portions 112. The step portion 111, the bevel portion 112, the step portion 111, the bevel portion 112, the step portion 111, the bevel portion 112, the step portion 111, and the bevel portion 112 are sequentially alternately disposed along the annular path CIR of the inner annular surface 113.

Referring to FIG. 2 again, the optical lens assembly 12 and the optical filter 13 are sequentially disposed in the accommodating space 115 of the lens barrel 11 from the object side OS to the image side IS. In addition, the optical filter 13 is disposed on the step portions 111 of the lens barrel 11. In this embodiment, the optical lens assembly 12 includes an optical lens 121. The optical lens 121 is a lens of the optical lens assembly 12 closest to the image side IS, and may be made of a plastic or glass material. Another optical element may also be disposed in the lens barrel 11. For example, the optical element may include a spacer ring, a light shielding element (for example, an aperture stop or a stop configured to correct edge light), or the like.

Referring to FIG. 2 and FIG. 1 again, the adhesive 14 (i.e., a glue, for example, an UV glue, i.e., an ultraviolet curing glue, but is not limited thereto) is disposed between the optical filter 13 and the lens barrel 11. The adhesive 14 is disposed on the bevel portions 112 of the lens barrel 11. In addition, the adhesive 14 is disposed between the optical lens 121 and the lens barrel 11 (for example, an annular trench 1213 is formed between a non-optical region 1212 of the optical lens 121 and the lens barrel 11, and the adhesive 14 flows into the annular trench 1213), and is used for simultaneously fixing the optical filter 13 and the optical lens 121 of the optical lens assembly 12.

Referring to FIG. 2 again, each of the step portions 111 includes a groove 1111, each of the grooves 1111 is adjacent to the inner annular surface 113, and the adhesive 14 is disposed in each of the grooves 1111. In this way, an adhesive area of the adhesive 14 to the optical filter 13 is increased, thereby increasing an adhesive force between the optical filter 13 and the lens barrel 11. Furthermore, the bevel portions 112 are connected to the inner annular surface 113. There is an angle $\theta 1$ between a bevel 1121 of each of the bevel portions 112 and the central axis 10, and the following condition is satisfied: $5°<\theta 1<85°$. In this way, the adhesive 14 flows into the annular trench 1213 between the non-optical region 1212 of the optical lens 121 and the lens barrel 11 at a proper flow rate. Preferably, the angle $\theta 1$ further satisfies the following condition: $15°<\theta 1<75°$. In this embodiment, a normal direction of the bevel 1121 of the bevel portion 112 faces the image side IS.

Figure 5:
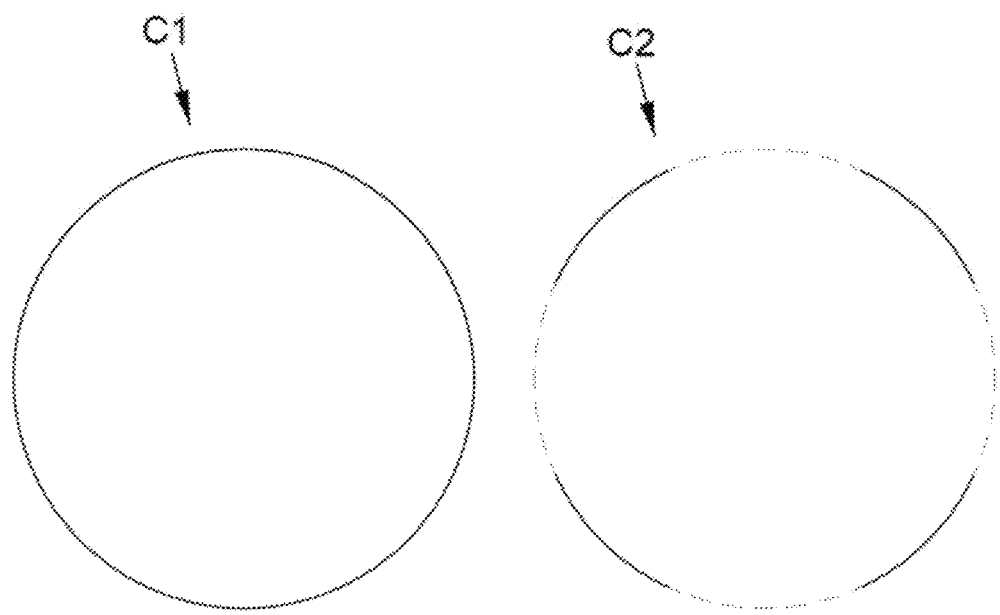
FIG. 5 shows that at least two step portions have a partial circumference C2, and an annular structure has a complete circumference C1.

Referring to FIG. 5 and FIG. 1, the step portions 111 have a partial circumference C2 along the annular path CIR of the inner annular surface 113, the annular structure 110 has a complete circumference C1 along the annular path CIR of the inner annular surface 113, and the following condition is satisfied: $0.25<C2/C1<0.75$. In this way, the step portions 111 form a sufficient supporting length, so that the optical filter 13 rests steadily on the step portions 111.

Figure 6:
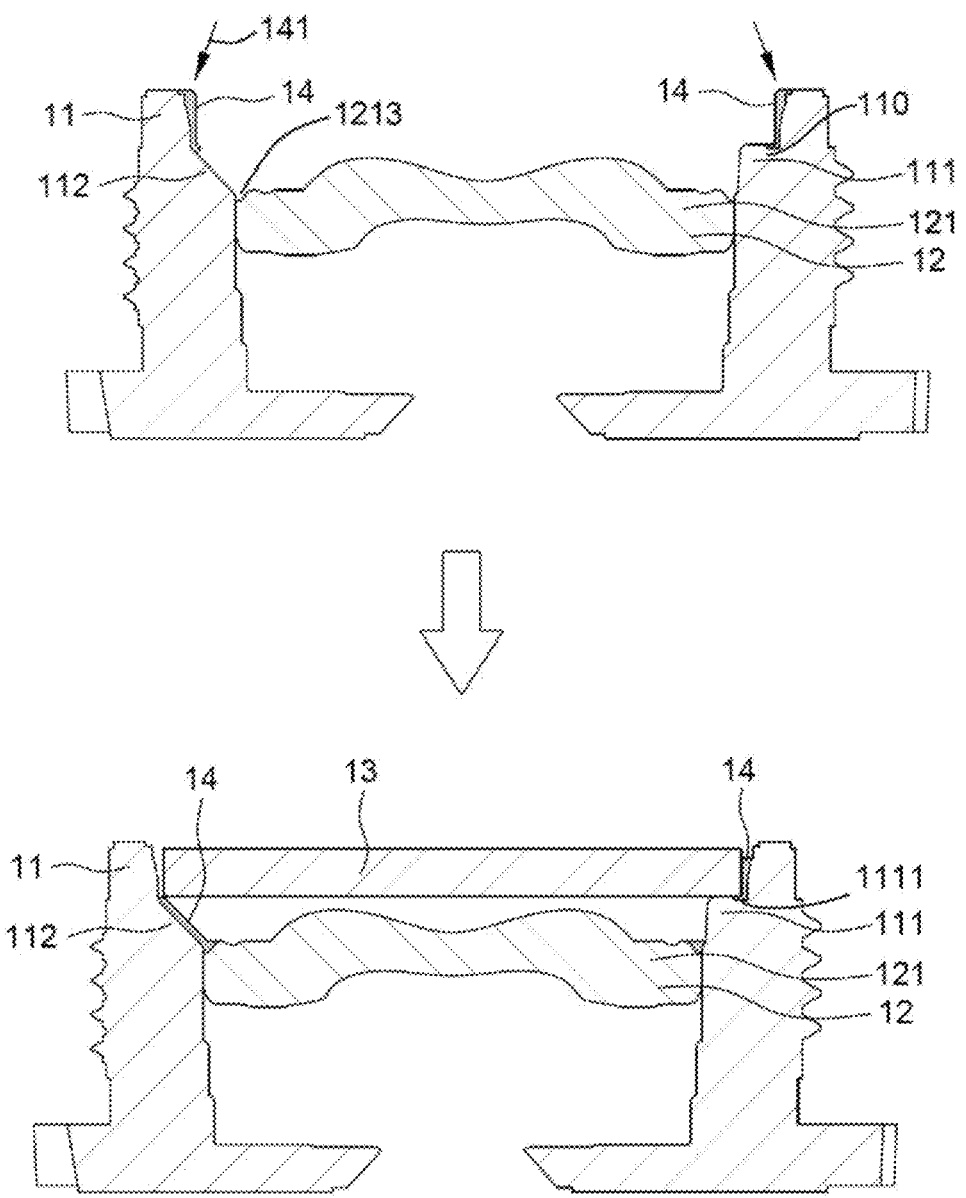
FIG. 6 is a schematic cross-sectional view of a method for dispensing an adhesive and assembling an optical filter according to the first embodiment of the present disclosure.

FIG. 6 is a schematic cross-sectional view of a method for dispensing an adhesive and assembling an optical filter according to the first embodiment of the present disclosure. In the present disclosure, the annular structure 110 of the lens barrel 11 includes at least two step portions 111 and at least two bevel portions 112. Each of the step portions 111 includes a groove 1111 (i.e., an adhesive dispensing groove). First, the adhesive 14 is annularly dispensed on the inner annular surface 113 of the lens barrel 11 (as indicated by an arrow 141), and then the optical filter 13 is disposed on the step portions 111, so as to complete the assembly of the optical filter 13. Due to the design of the bevel portions 112 and the grooves 1111, the adhesive 14 is dispensed only once. The adhesive 14 (for example, an UV glue, i.e., an ultraviolet curing glue, but is not limited thereto) may flow down from the bevel portions 112 and the grooves 1111 to the annular trench 1213 between the last optical lens 121 of the optical lens assembly 12 and the lens barrel 11, and is finally irradiated by UV for curing. In this way, the optical filter 13 and the last optical lens 121 (i.e., the optical lens closest to the image side) of the optical lens assembly 12 can be fixed simultaneously, to improve the adhesive dispensing efficiency, thereby improving the assembly efficiency of the lens module.

Figure 7:
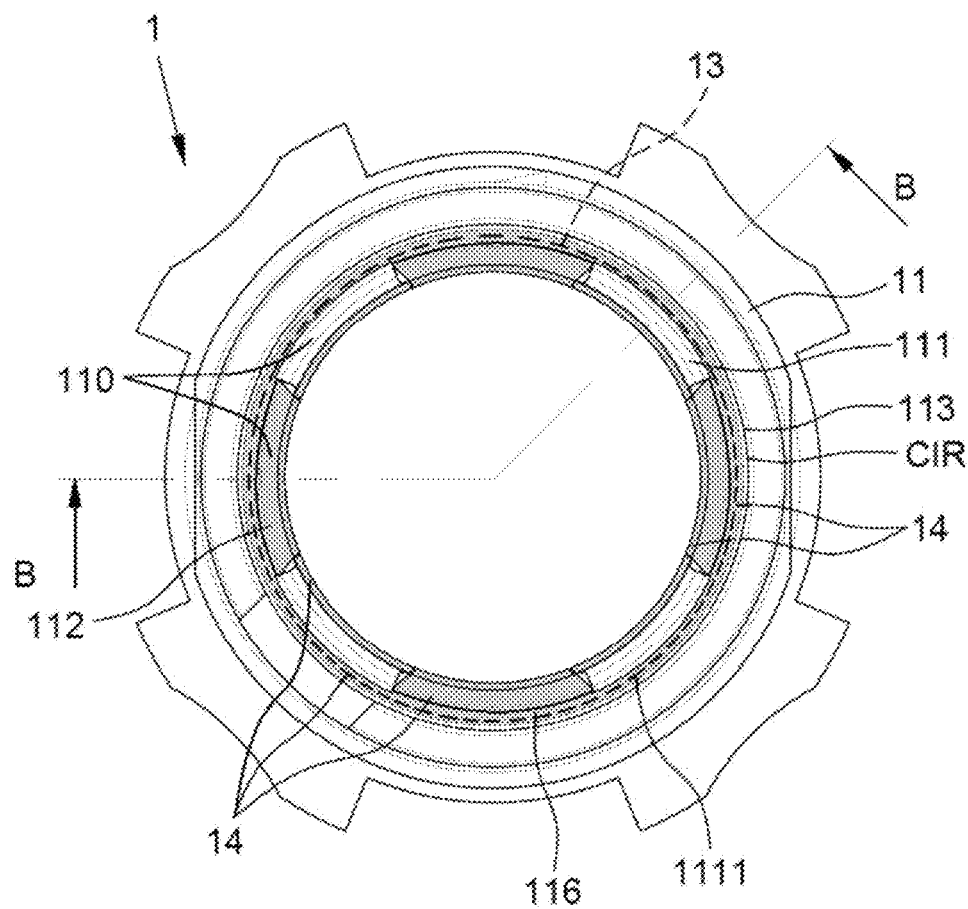
FIG. 7 is a schematic plan view of a lens module according to a second embodiment of the present disclosure.
Figure 8:
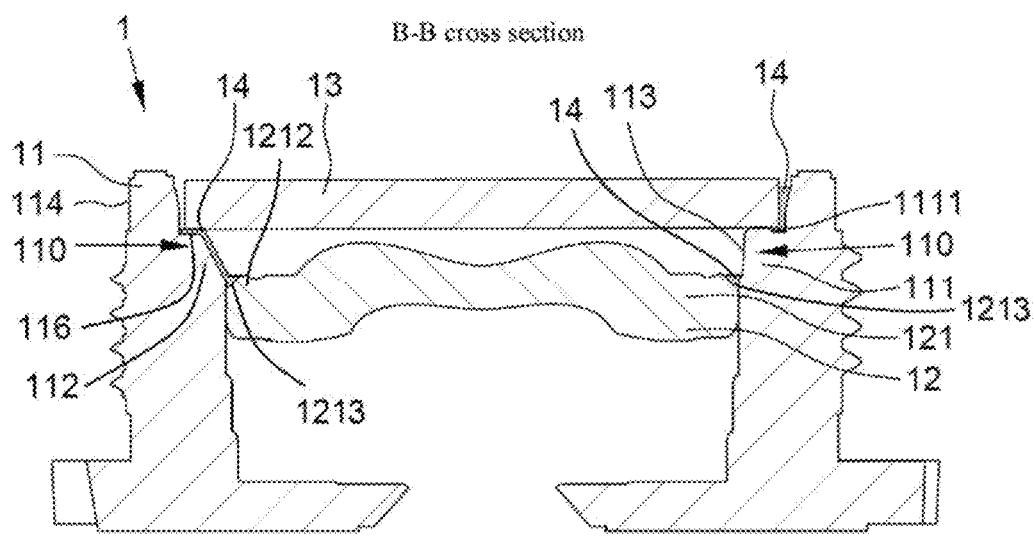
FIG. 8 is a schematic cross-sectional view of a lens module along a section line B-B in FIG. 7 according to the present disclosure.

FIG. 7 is a schematic plan view of a lens module according to a second embodiment of the present disclosure, wherein a contour of an optical filter is indicated by a dashed line. FIG. 8 is a schematic cross-sectional view of a lens module according to the present disclosure along a section line B-B in FIG. 7. The lens module 1 of the second embodiment is approximately similar to the lens module 1 of the first embodiment, and similar elements are marked with similar reference numerals. The lens module 1 of the second embodiment differs from the lens module 1 of the first embodiment in that: in the second embodiment, the annular structure 110 includes at least two platforms 116, and each of the platforms 116 is disposed between each of the bevel portions 112 and the inner annular surface 113. Each of the bevel portions 112 is connected to the corresponding platform 116. That is, the bevel portions 112 are connected to the inner annular surface 113 through the platforms 116. The design of the platforms 116 causes a part of the adhesive 14 to stay on the platforms 116 and a part of the adhesive 14 to flow down along the bevel portions 112 through the platforms 116. The adhesive 14 staying on the platforms 116 can increase an adhesive area of the adhesive 14 to the optical filter 13, thereby increasing an adhesive force between the optical filter 13 and the lens barrel 11. In this embodiment, the platform 116 and a bottom of each of the grooves 1111 are coplanar.

Referring to FIG. 8 and FIG. 7 again, the adhesive 14 (i.e., a glue, for example, an UV glue, i.e., an ultraviolet curing glue, but is not limited thereto) is disposed between the optical filter 13 and the lens barrel 11. The adhesive 14 is disposed on each of the platforms 116. The adhesive 14 is disposed on the bevel portions 112. In addition, the adhesive 14 is disposed between the optical lens 121 and the lens barrel 11 (for example, an annular trench 1213 is formed between a non-optical region 1212 of the optical lens 121 and the lens barrel 11, and the adhesive 14 flows into the entire annular trench 1213), and is used for simultaneously fixing the optical filter 13 and the optical lens 121 of the optical lens assembly 12.

Due to the design of the platforms 116, the bevel portions 112, and the grooves 1111, the adhesive 14 (for example, an UV glue, that is, an ultraviolet curing glue, but is not limited thereto) may flow down from the platforms 116, the bevel portions 112, and the grooves 1111 to the annular trench 1213 between the last optical lens 121 of the optical lens assembly 12 and the lens barrel 11, and is finally irradiated by UV for curing. In this way, the optical filter 13 and the last optical lens 121 (i.e., the optical lens closest to the image side) of the optical lens assembly 12 can be fixed simultaneously, to improve the adhesive dispensing efficiency, thereby improving the assembly efficiency of the lens module.

Figure 9:
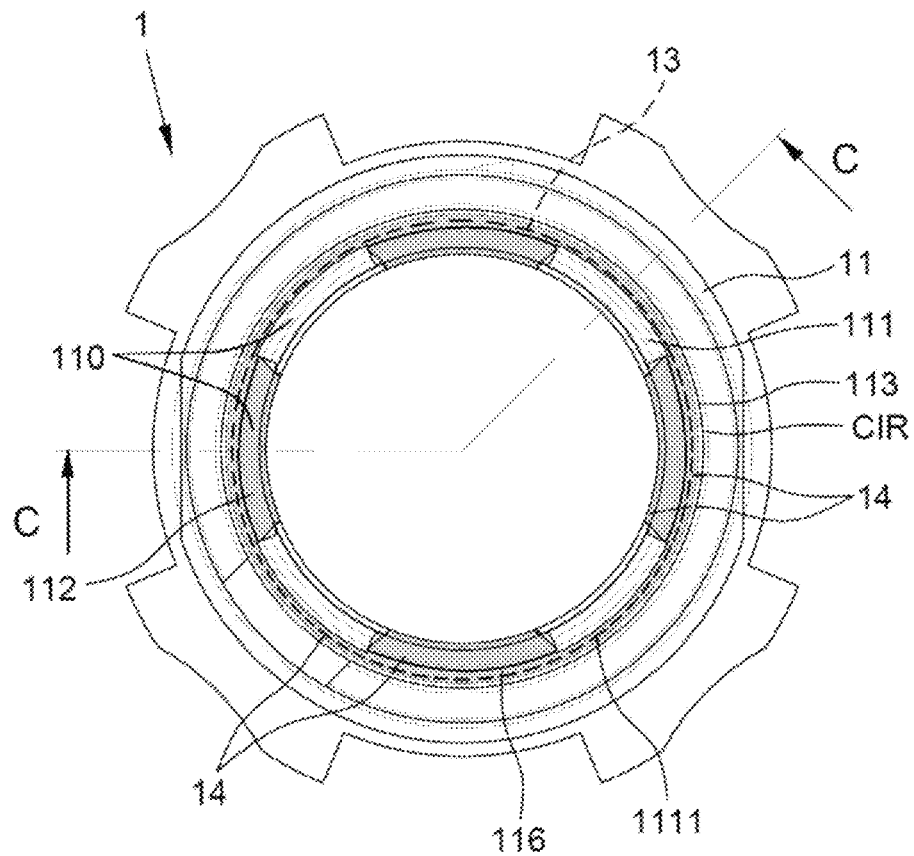
FIG. 9 is a schematic plan view of a lens module according to a third embodiment of the present disclosure.
Figure 10:
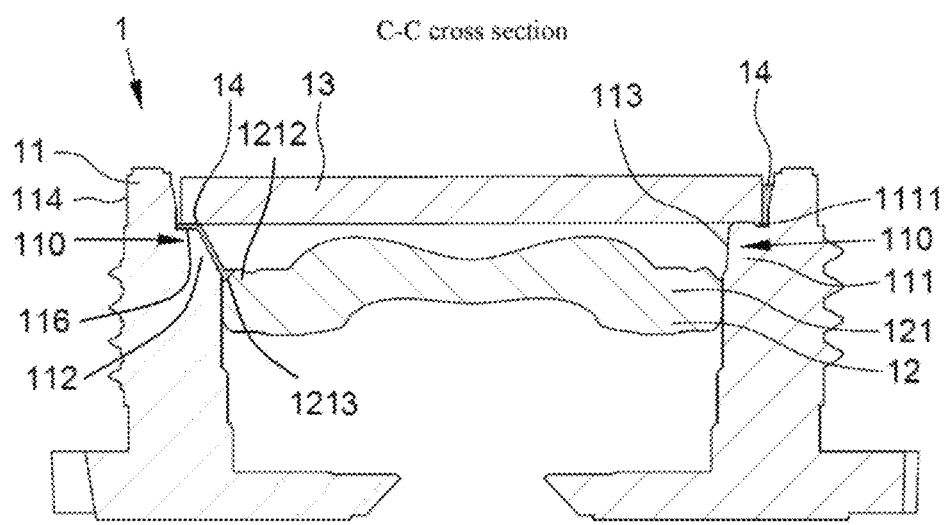
FIG. 10 is a schematic cross-sectional view of a lens module along a section line C-C in FIG. 9 according to the present disclosure.

FIG. 9 is a schematic plan view of a lens module 5 according to a third embodiment of the present disclosure, wherein a contour of an optical filter is indicated by a dashed line. FIG. 10 is a schematic cross-sectional view of a lens module according to the present disclosure along a section line C-C in FIG. 9. The lens module 1 of the third embodiment is approximately similar to the lens module 1 of the second embodiment, and similar elements are marked with similar reference numerals. The lens module 1 of the third embodiment differs from the lens module 1 of the second embodiment in that: the adhesive 14 (i.e., a glue, for example, an UV glue, i.e., an ultraviolet curing glue, but is not limited thereto) is disposed between the optical filter 13 and the lens barrel 11, the adhesive 14 is disposed on each of the platforms 116, the adhesive 14 is disposed on the bevel portions 112, and the adhesive 14 is discontinuously disposed between the optical lens 121 and the lens barrel 11 (for example, an annular trench 1213 is formed between a non-optical region 1212 of the optical lens 121 and the lens barrel 11, the adhesive 14 flows into a part of the annular trench 1213, and the adhesive 14 is only located in the annular trench 1213 corresponding to the bevel portions), and is used for simultaneously fixing the optical filter 13 and the optical lens 121 of the optical lens assembly 12.

In the foregoing embodiments, the adhesive 14 is designed to fill up or partially fill up a gap between the optical filter 13 and the lens barrel 11 depending on the material properties or the size of the lens module 1.

In view of the above, the foregoing descriptions are merely preferred embodiments of technical means adopted by the present disclosure to solve the problem, but are not intended to limit the scope of the embodiments of the present disclosure. Any equivalent variation and modification consistent with the meaning of the scope of the present disclosure or made according to the scope of the present disclosure shall fall within the protection scope of the present disclosure.

What is claimed is:

1. A lens module, defining a central axis, an object side, and an image side opposite to object side, and the lens module comprising:
    a lens barrel comprising a annular structure, an inner annular surface surrounding the central axis and an outer annular surface opposite to and surrounding the inner annular surface, wherein the inner annular surface forms an accommodating space; and
    an optical lens assembly and an optical filter sequentially disposed in the accommodating space from the object side to the image side;
    wherein the annular structure is disposed on the inner annular surface and surrounds the central axis, the annular structure comprises at least two step portions and at least two bevel portions, all the step portions and the bevel portions are close to the image side, and the optical filter is disposed on the step portions; and
    the step portions and the bevel portions are alternately disposed along an annular path of the inner annular surface.

2. The lens module according to claim 1, further comprising an adhesive disposed between the optical filter and the lens barrel, and disposed on the bevel portions.

3. The lens module according to claim 2, wherein the optical lens assembly comprises an optical lens, and the adhesive is disposed between the optical lens and the lens barrel.

4. The lens module according to claim 2, wherein each of the step portions comprises a groove, each of the grooves is adjacent to the inner annular surface, and the adhesive is disposed in each of the grooves.

5. The lens module according to claim 4, wherein the annular structure further comprises at least two platforms, each of the platforms is disposed between each of the bevel portions and the inner annular surface, and the adhesive is disposed on each of the platforms.

6. The lens module according to claim 5, wherein the optical lens assembly comprises an optical lens, and the adhesive is discontinuously disposed between the optical lens and the lens barrel.

7. The lens module according to claim 5, wherein the platforms and a bottom of each of the grooves are coplanar.

8. The lens module according to claim 5, wherein each of the bevel portions is connected to the corresponding platform.

9. The lens module according to claim 2, wherein the bevel portions are connected to the inner annular surface.

10. The lens module according to claim 1, wherein the step portions have a partial circumference C2 along the annular path of the inner annular surface, the annular structure has a complete circumference C1 along the annular path of the inner annular surface, and the following condition is satisfied: $0.25 < C2/C1 < 0.75$.

11. The lens module according to claim 1, wherein there is angle $\theta 1$ between a bevel of each of the bevel portions and the central axis, and the following condition is satisfied: $5° < \theta 1 < 85°$.

* * * * *